(12) United States Patent
Itano et al.

(10) Patent No.: US 12,410,352 B2
(45) Date of Patent: Sep. 9, 2025

(54) REFRIGERANT-CONTAINING COMPOSITION, USE THEREOF, REFRIGERATOR HAVING SAID COMPOSITION, AND METHOD FOR OPERATING SAID REFRIGERATOR

(71) Applicant: DAIKIN INDUSTRIES, LTD., Osaka (JP)

(72) Inventors: Mitsushi Itano, Osaka (JP); Shun Ohkubo, Osaka (JP); Satoshi Tokuno, Osaka (JP); Tomoyuki Gotou, Osaka (JP); Takashi Usui, Osaka (JP); Takashi Yoshimura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 87 days.

(21) Appl. No.: 18/244,062

(22) Filed: Sep. 8, 2023

(65) Prior Publication Data

US 2024/0010896 A1    Jan. 11, 2024

Related U.S. Application Data

(63) Continuation of application No. PCT/JP2022/010104, filed on Mar. 8, 2022.

(30) Foreign Application Priority Data

Mar. 9, 2021 (JP) ................ 2021-037767

(51) Int. Cl.
    *C09K 5/04* (2006.01)
(52) U.S. Cl.
    CPC ........ *C09K 5/045* (2013.01); *C09K 2205/122* (2013.01); *C09K 2205/126* (2013.01); *C09K 2205/22* (2013.01); *C09K 2205/40* (2013.01)

(58) Field of Classification Search
    CPC .............. C09K 5/045; C09K 2205/122; C09K 2205/126; C09K 2205/22; C09K 2205/40; F25B 2400/12
    See application file for complete search history.

(56) References Cited

U.S. PATENT DOCUMENTS

| 2014/0077123 A1 | 3/2014 | Fukushima |
| 2017/0002245 A1 * | 1/2017 | Fukushima ............... F25B 1/00 |

(Continued)

FOREIGN PATENT DOCUMENTS

| AU | 2018392046 A1 * | 8/2020 | ............... C09K 5/04 |
| JP | 6617849 B1 * | 12/2019 | ............. C09K 5/044 |

(Continued)

OTHER PUBLICATIONS

International Search Report issued May 17, 2022 in International (PCT) Application No. PCT/JP2022/010104.

(Continued)

*Primary Examiner* — Emmanuel E Duke
(74) *Attorney, Agent, or Firm* — IWENDEROTH, LIND & PONACK, L.L.P.

(57) ABSTRACT

An object is to suppress disproportionation in a refrigerant comprising HFO-1132(E). Provided as a means for a solution is a method for suppressing a disproportionation reaction of HFO-1132(E), the method comprising operating a refrigeration cycle using a composition comprising a refrigerant, the refrigerant comprising trans-1,2-difluoroethylene (HFO-1132(E)), trifluoroethylene (HFO-1123), and difluoromethane (R32).

27 Claims, 2 Drawing Sheets

(56) References Cited

U.S. PATENT DOCUMENTS

| | | |
|---|---|---|
| 2020/0392388 A1 | 12/2020 | Itano et al. |
| 2021/0003323 A1 | 1/2021 | Kumakura et al. |
| 2022/0098460 A1 | 3/2022 | Itano et al. |
| 2022/0177762 A1 | 6/2022 | Itano et al. |
| 2022/0177764 A1 | 6/2022 | Itano et al. |

FOREIGN PATENT DOCUMENTS

| | | | |
|---|---|---|---|
| WO | 2012/157765 | 11/2012 | |
| WO | WO-2012157763 A1 * | 11/2012 | ............. C07C 21/18 |
| WO | WO-2015005290 A1 * | 1/2015 | ............. C09K 5/04 |
| WO | WO-2015141678 A1 * | 9/2015 | ............. C09K 5/04 |
| WO | 2019/124140 | 6/2019 | |
| WO | WO-2019124146 A1 * | 6/2019 | ............. C09K 5/04 |
| WO | 2020/256112 | 12/2020 | |
| WO | 2020/256119 | 12/2020 | |
| WO | 2020/256133 | 12/2020 | |
| WO | 2020/256134 | 12/2020 | |
| WO | WO-2020256119 A1 * | 12/2020 | ............. C09K 5/045 |
| WO | WO-2020256134 A1 * | 12/2020 | |

OTHER PUBLICATIONS

McLinden et al., "Limited options for low-global-warming-potential refrigerants", Nature Communications, 2017, vol. 8, Article No. 14476, pp. 1-9.

International Preliminary Report on Patentability issued Sep. 12, 2023 in International (PCT) Application No. PCT/JP2022/010104.

Extended European Search Report issued Jul. 11, 2024 in corresponding European Patent Application No. 22767165.8.

Tetsuo Otsuka et al., Development of Control Method of HFO-1123 disproportionation and investigation of probability of HFO-1123 disproportionation, AGC Research Report, vol. 68, 2018, pp. 29-33.

* cited by examiner

REFRIGERANT-CONTAINING COMPOSITION, USE THEREOF, REFRIGERATOR HAVING SAID COMPOSITION, AND METHOD FOR OPERATING SAID REFRIGERATOR

TECHNICAL FIELD

The present disclosure relates to a composition comprising a refrigerant, use of the composition, a refrigerating machine having the composition, and a method for operating the refrigerating machine.

BACKGROUND ART

A working medium containing 1,2-difluoroethylene (HFO-1132) has been proposed (Patent Literature (PTL) 1).

CITATION LIST

Patent Literature

PTL 1: WO2012/157765

SUMMARY

Item 1

A method for suppressing a disproportionation reaction of HFO-1132(E), the method comprising operating a refrigeration cycle using a composition comprising a refrigerant, the refrigerant comprising trans-1,2-difluoroethylene (HFO-1132(E)), trifluoroethylene (HFO-1123), and difluoromethane (R32),
wherein
when the mass % of HFC-1132(E), SFO-1123, and R32 based on their sum is respectively represented by x, y, and z, coordinates (x,y,z) in a ternary composition diagram in which the sum of HFO-1132(E), HFO-1123, and P32 is 100 mass % are within the range of a figure surrounded by straight lines AB, EP, and PA that connect the following three points:
point A (54.0, 0.0, 46.0),
point B (0.0, 68.0, 32.0), and
point P (0.0, 0.0, 100.0),
or on the straight line AB (excluding the points A and B).

Advantageous Effects

According to the present disclosure, disproportionation in a refrigerant comprising HFO-1132(E) can be suppressed.

DESCRIPTION OF EMBODIMENTS

Figure 1:
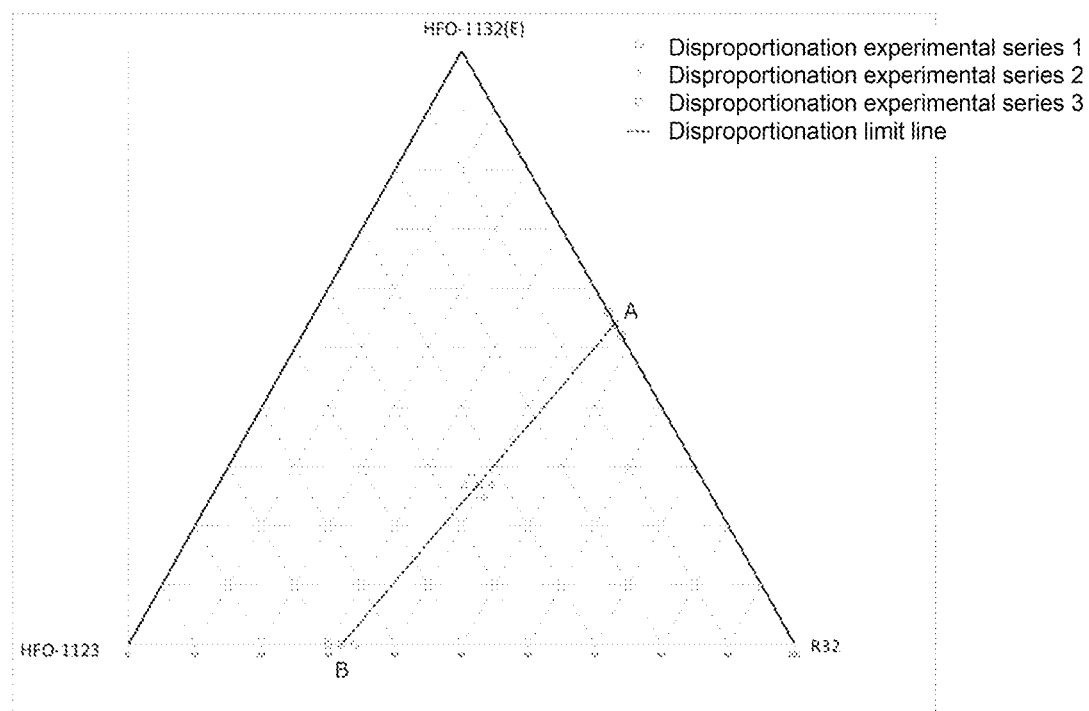
FIG. 1 is a ternary diagram that shows a compositional ratio of a mixed refrigerant subjected to a disproportionation suppression test in the Examples and a disproportionation limit line derived from the results.
Figure 2:
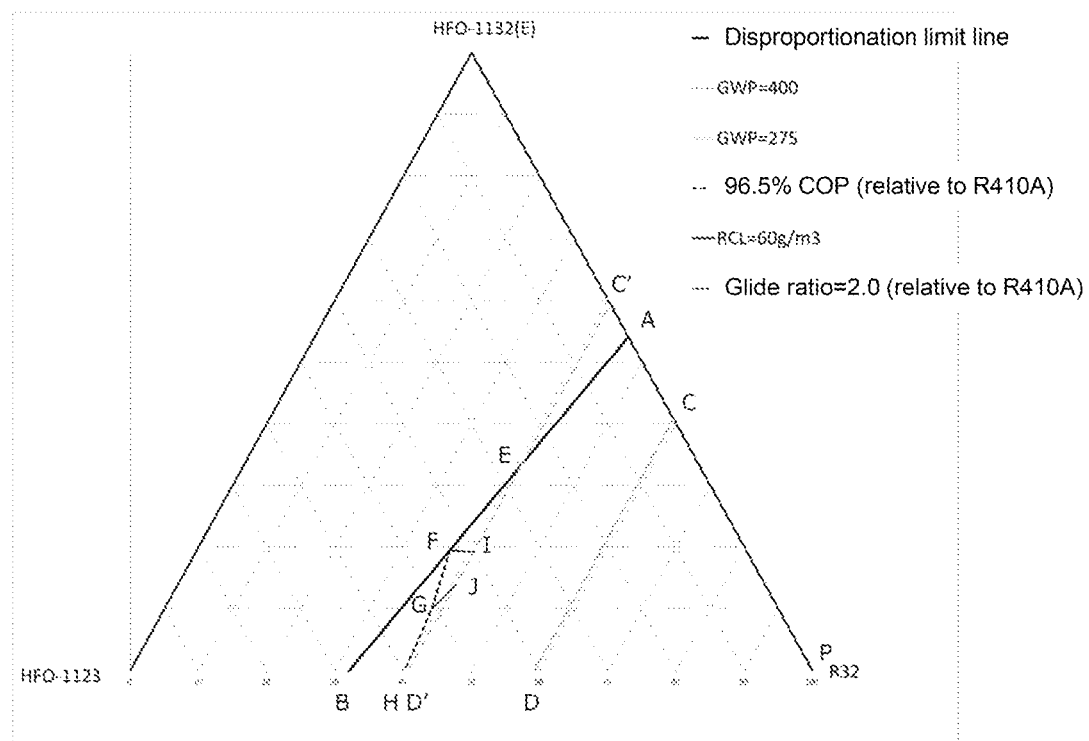
FIG. 2 is a ternary diagram that shows a compositional ratio of the composition of the present invention.

HFO-1132(E) is chemically unstable due to its unsaturated bond and may be at risk of disproportionation. As a result of intensive studies to achieve the above object, the present inventors found that disproportionation HFO-1132 (E) is suppressed in a mixed refrigerant comprising HFO-1132(E), HFO-1123, and R32 at a specific mixing ratio.

The present disclosure has been completed as a result of further research based on this finding. The present disclosure includes the following embodiments.

Definition of Terms

In the present specification, the term "refrigerant" includes at least compounds that are specified in ISO 817 (International Organization for Standardization), and that are given a refrigerant number (PSH AE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC).

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

The unit for the pressure described in the present specification is absolute pressure (MPa), unless otherwise specified.

In the present specification, a refrigerant having an "RCL of x % or more" means that the refrigerant has a refrigerant concentration limit (RCL), calculated in accordance with the US ANSI/ASHRAE Standard 34-2013, of x % or more. RCL refers to a concentration limit in the air in consideration of safety factors. RCL is an index for reducing the risk of acute toxicity, suffocation, and flammability in a closed space where humans are present. RCL is determined in accordance with the ASHRAE Standard. More specifically, RCL is the lowest concentration among the acute toxicity exposure limit (ATEL), the oxygen deprivation limit (ODL), and the flammable concentration limit (FCL), which are respectively calculated in accordance with sections 7.1.1, 7.1.2, and 7.1.3 of the ASHRAE Standard.

1. Refrigerant 1.1 Refrigerant Component

The refrigerant according to the present disclosure is a mixed refrigerant comprising HFO-1132(E), HFO-1123, and R32.

Since the refrigerant according to the present disclosure satisfies the following requirements, disproportionation of HFO-1132(E) is suppressed at a refrigerant pressure of 3.0 MPa.

Requirements

In the refrigerant, coordinates (x,y,z) are within the range of a figure surrounded by straight lines AB, BP, and PA that connect the following three points:

point A (54.0, 0.0, 46.0),
point B (0.0, 68.0, 32.0), and
point P (0.0, 0.0, 100.0),
or on the straight line AB (excluding the points A and B).

Since the refrigerant according to the present disclosure satisfies the following requirements, it is not only that disproportionation of HFO-1132(E) is further suppressed at a refrigerant pressure of 3.0 MPa, but also that the GWP is 400 or less.

Requirements

In the refrigerant, coordinates (x,y,z) are within the range of a figure surrounded by straight lines AB, BD, DC, and CA that connect the following four points:

point A (54.0, 0.0, 46.0),
point B (0.0, 68.0, 32.0),
point D (0.0, 40.8, 59.2), and
point C (40.8, 0.0, 59.2),
or on the straight lines, AB and DC (excluding the points A, B, D, and C).

Since the refrigerant according to the present disclosure satisfies the following requirements, it is not only that disproportionation of HFO-1132(E) is suppressed, but also that the GWP is 275 or less.

Requirements

In the refrigerant, coordinates (x,y,z) are within the range of a figure surrounded by straight lines EB, ED', and D'E that connect the following three points:

point E (33.6, 25.7, 40.7),
point B (0.0, 68.0, 32.0), and
point D' (0.0, 59.3, 40.7),
or on the straight lines EB and D'E (excluding the points B and D').

Since the refrigerant according to the present disclosure satisfies the following requirements, disproportionation of HFO-1132(E) is suppressed at a refrigerant pressure of 3.0 MPa. Additionally, it is not only that the GWP is 275 or less, but also that the refrigerant concentration limit (RCL) is 60 g/m$^3$ or more, and the COP ratio is 96.5% or more relative to that of R410A.

Requirements

The refrigerant comprises HFO-1132 (E), HFO-1123, and R32, and when the mass % of HFO-1132 (E), HFO-1123, and R32 based on their sum is respectively represented by x, y, and z, coordinates (x,y,z) in a ternary composition diagram in which the sum of HFO-1132 (E), HFO-1123, and R32 is 100 mass % are within the range of a figure surrounded by straight lines FG, GH, HD', D'I, and IF that connect the following five points:

point F (19.5, 43.4, 37.1),
point G (10.0, 50.8, 39.2),
point H (0.0, 59.8, 40.2),
point D' ' (0.0, 59.3, 40.7), and
point I (19.2, 40.1, 40.7),
or on the straight lines.

Since the refrigerant according to the present disclosure satisfies the following requirements, disproportionation of HFO-1132(E) is suppressed. Additionally, it is not only that the GWP is 275 or less, but also that the refrigerant concentration limit (RCL) is 60 g/m$^3$ or more, the COP ratio is 96.5% or more relative to that of R410A, and the condensation temperature glide is 2.0 or less relative to that of R410A.

Requirements

In the refrigerant, coordinates (x,y,z) are within the range of a figure surrounded by straight lines FG, GJ, JI, and IF that connect the following four points:

point F (19.5, 43.4, 37.1),
point G (10.0, 50.8, 39.2),
point J (13.9, 45.4, 40.7), and
point I (19.2, 40.1, 40.7),
or on the straight lines.

The refrigerant according to the present disclosure may further comprise other additional refrigerants, in addition to HFO-1132(H), HFO-1123, and R32, as long as the above properties and effects are not impaired. In this respect, the refrigerant according to the refrigerant according to the present disclosure preferably comprises HFO-1132(E), HFO-1123, and R32 in a total amount of 99.5 mass % or more, more preferably 99.75 mass % or more, even more preferably 99.9 mass % or more, still more preferably 99.99 mass % or more, and most preferably 99.999 mass % or more, based on the entire refrigerant. The refrigerant according to the present disclosure may essentially consist of HFO-1132(E), HFO-1123, and R32, or may consist of HFO-1132(E), HFO-1123, and R32. When the refrigerant according to the present disclosure essentially consists of HFO-1132(E), HFO-1123, and R32, the refrigerant may contain, in addition to HFO-1123(E) HFO-1123, and R32, impurities that are inevitably mixed during the production process thereof.

Additional refrigerants are not limited and can be widely selected. The mixed refrigerant may contain one additional refrigerant, or two or more additional refrigerants. Examples of the additional refrigerants include acetylene, HFO-1132a, HFO-1141, HFO-1123, HFC-143a, HFC-134a, Z-HFO-1132, HFO-1243zf, HFC-245cb, HCFC-1122, HCFC-124, CFC-1113, HFC-152a, HFC-161, and 3,3,3-trifluoropropyne. The total amount of the additional refrigerants is preferably 0.5 mass % or less, more preferably 0.25 mass % or less, still more preferably 0.1 mass % or less, and most preferably 0.01 mass % or less, based on the entire refrigerant.

1.2. Use

The refrigerant according to the present disclosure can be preferably used as a working fluid in a refrigerating machine.

The composition according to the present disclosure is suitable for use as an alternative refrigerant for R410A.

2. Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 1 mass % or less, and more preferably 0.1 mass % or less.

2.1. Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that be present in the refrigerant, and makes it less likely that the unsaturated fluorocarbon compounds will be oxidized, thus increasing the stability of the refrigerant composition.

2.2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferred as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFF-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition according to the present disclosure may comprise one or more tracers at a total concentration of about 10 parts per million by weight (ppm) or more and about 1000 ppm or less, based on the entire refrigerant composition. The refrigerant composition according to the present disclosure preferably comprises one or more tracers at a total concentration of about 30 ppm or more, and more preferably about 50 ppm or more, based on the entire refrigerant composition. The refrigerant composition according to the present disclosure preferably comprises one or more tracers at a total concentration of about 500 ppm or less, and more preferably about 300 ppm or less, based on the entire refrigerant composition.

2.3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthozanthene, fluorescein, and derivatives thereof. The ultraviolet fluorescent dye is particularly preferably either naphthalimide or coumarin, or both.

2.4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 mass % or more, and more preferably 0.05 mass % or more, based on the entire refrigerant. Generally, the content of the stabilizer is preferably 5 mass % or less, and more preferably 2 mass % or less, based on the entire refrigerant.

2.5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 mass % or more, and more preferably 0.05 mass % or more, based on the entire refrigerant. Generally, the content of the polymerization inhibitor is preferably 5 mass % or less, based on the entire refrigerant.

3. Refrigeration Oil-Containing Working Fluid

The refrigeration nil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 mass % or more and 50 mass % or less of refrigeration oil.

3.1. Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAP), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 cSt or more at 40° C. is preferable from the standpoint of lubrication. A refrigeration oil with a kinematic viscosity of 400 cSt or less at 40° C. is preferable from the standpoint of lubrication.

The refrigeration oil-containing working fluid according to the present disclosure may further optionally contain at least one additive. Examples of additives include the combatibilizing agents described below.

3.2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polvoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polvoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises the step of circulating the refrigerant according to the present disclosure in a refrigerating machine.

5. Method for Suppressing Disproportionation Reaction

The method for suppressing a disproportionation reaction according to the present disclosure is a method for suppressing a disproportionation reaction of HFO-1132(E), the method comprising operating a refrigeration cycle using the refrigerant according to the present disclosure.

The method for suppressing a disproportionation reaction according to the present disclosure produces an effect of preventing a disproportionation reaction of HFO-1132(E) from occurring, in particular, at a refrigerant pressure of 3.0 MPa.

By the method for suppressing a disproportionation reaction according to the present disclosure, a refrigeration cycle can be operated in a refrigerating machine that has no particular means for suppressing a disproportionation reaction.

6. Use in Suppressing Disproportion Reaction

The use according to the present disclosure is use of HFO-1123 and/or R32 in suppressing a disproportionation reaction of HFO-1132(E); the suppression of the disproportionation reaction is performed by mixing HFC-1132(E), HFO-1123, and R32 such that the mixing ratio thereof is equal to that used in the refrigerant according to the present disclosure.

The use in suppressing a disproportionation reaction according to the present disclosure produces an effect of preventing a disproportionation reaction of HFO-1132(E) from occurring, in particular, at a refrigerant pressure of 3.0 MPa.

The embodiments are described above; however, it will be understood that various changes in forms and details can be made without departing from the spirit and scope of the claims.

Item 1

A method for suppressing a disproportionation reaction of HFO-1132(E), the method comprising operating a refrigeration cycle using a composition comprising a refrigerant, the refrigerant comprising trans-1,2-difluoroethylehe (HFO-1132(E)), trifluoroethylene (HFO-1123), and difluoromethane (R32), wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by straight lines AB, DP, and PA that connect the following three points:
point A (54.0, 0.0, 46.0),
point B (0.0, 68.0, 32.0), and
point P (0.0, 0.0, 100.0),
or on the straight line AB (excluding the points A and B).

Item 2

The method according to Item 1, wherein in the refrigerant, coordinates (x,y,z) are within the range of a figure surrounded by straight lines AB, BD, DC and CA that connect the following four points:
point A (54.0, 0.0, 46.0),
point B (0.0, 68.0, 32.0),
point D (0.0, 40.8, 59.2), and
point C (40.8, 0.0, 59.2),
or on the straight lines AB and DC (excluding the points A, B, D, and C).

Item 3

The method according to Item 1, wherein in the refrigerant, coordinates (x,y,z) are within the range of a figure surrounded by straight lines EB, BD', and D'E that connect the following three points:
point E (33.6, 25.7, 40.7),
point E (0.0, 68.0, 32.0), and
point D' (0.0, 59.3, 40.7),
or on the straight lines EB and D'E (excluding the points B and D').

Item 4

The method according to Item 1, wherein in the refrigerant, coordinates (x,y,z) are within the range of a figure surrounded by straight lines FG, GB, HD', D'I, and IF that connect the following five points:
point F (19.5, 43.4, 37.1),
point G (10.0, 50.8, 39.2),
point H (0.0, 59.8, 40.2),
point D' (0.0, 59.3, 40.7), and
point I (19.2, 40.1, 40.7),
or on the straight lines (excluding the points H and D' and the straight line HD').

Item 5

The method according to Item 1, wherein in the refrigerant, coordinates (x,y,z) are within the range of a figure surrounded by straight lines FG, GJ, JI, and IF that connect the following four points:
point F (19.5, 43.4, 37.1),
point C (10.0, 50.8, 39.2),
point J (13.9, 45.4, 40.7), and
point I (19.2, 40.1, 40.7),
or on the straight lines.

Item 6

Use of a composition comprising a refrigerant for suppressing a disproportionation reaction of HFO-1132(E), the refrigerant comprising HFO-1132(E), HFO-1123, and R32, wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by straight lines AB, BP, and PA that connect the following three points:
point A (54.0, 0.0, 46.0),
point B (0.0, 68.0, 32.0), and
point P (0.0, 0.0, 100.0),
or on the straight line AB (excluding the points A and B).

Item 7

The use according to Item 6, wherein in tree refrigerant, coordinates (x,y,z) are within the range of a figure surrounded by straight lines AB, BD, DC, and CA that connect the following four points:
point A (54.0, 0.0, 46.0),
point B (0.0, 68.0, 32.0),
point D (0.0, 40.8, 59.2), and
point C (40.8, 0.0, 59.2),
or on the straight lines AB and DC (excluding the points A, B, D, and C).

Item 8

The use according to Item 6, wherein in the refrigerant, coordinates (x,y,z) are within the range of a figure surrounded by straight lines EB, BD', and D'E that connect the following three points:
point E (33.6, 25.7, 40.7),
point B (0.0, 68.0, 32.0), and
point D' (0.0, 59.3, 40.7),
or on the straight lines EB and D'E (excluding the points B and D').

Item 9

The use according to Item 6, wherein in the refrigerant, coordinates (x,y,z) are within the range of a figure surrounded by straight lines FG, GH, HD', D'I, and IF that connect the following five points:
point F (19.5, 43.4, 37.1),
point G (10.0, 50.8, 39.2),
point H (0.0, 59.8, 40.2),
point D' (0.0, 59.3, 40.7), and
point I (19.2, 40.1, 40.7),
or on the straight lines.

Item 10

The use according to Item 6, wherein in the refrigerant, coordinates (x,y,z) are within the range of a figure surrounded by straight lines FG, GJ, JI, and IF that connect the following four points:
point F (19.5, 43.4, 37.1),
point G (10.0, 50.8, 39.2),
point J (13.9, 45.4, 40.7), and
point I (19.2, 40.1, 40.7),
or on the straight lines.

Item 11

Use of HFO-1123 and/or R32 for suppressing a disproportionation reaction of HFO-1132(E), the disproportionation reaction being suppressed by mixing HFO-1132(E), HFO-1123, and R32 such that when the mass % of HFO-1132(3), HFO-1123, and R32 based on their sum is respectively represented by x, y, and z, coordinates (x,y,z) in a ternary composition diagram in which the sum of HFO-1132 (E), HFO-1123, and R32 is 100 mass % are within the range of a figure surrounded by straight lines AB, BP, and PA that connect the following three points:
point A (54.0, 0.0, 46.0),
point B (0.0, 68.0, 32.0), and
point P (0.0, 0.0, 100.0),
or on the straight line AB (excluding the points A and B).

Item 12

The use according to Item 11, wherein in the refrigerant, coordinates (x,y,z) are within the range of a figure surrounded by straight lines AB, BD, DC, and CA that connect the following four points:
point A (54.0, 0.0, 46.0),
point B (0.0, 68.0, 32.0),
point D (0.0, 40.3, 59.2), and
point C (40.8, 0.0, 59.2),
or on the straight lines AB and DC (excluding the points A, B, D, and C).

Item 13

The use according to Item 11, wherein in the refrigerant, coordinates (x,y,z) are within the range of a figure surrounded by straight lines EB, BD', and D'E that connect the following three points:
point E (33.6, 25.7, 40.7),
point F (0.0, 68.0, 32.0), and
point D' (0.0, 59.3, 40.7),
or on the straight lines FE and D'E (excluding the points B and D').

Item 14

The use according to Item 11, wherein in the refrigerant, coordinates (x,y,z) are within the range of a figure surrounded by straight lines FG, GH, HD', D' and IF that connect the following five points:
point F (19.5, 43.4, 37.1),
point G (10.0, 50.5, 39.2),
point H (0.0, 59.8, 40.2),
point D' (0.0, 59.3, 40.7), and
point I (19.2, 40.1, 40.7),
or on the straight lines (excluding points H and D', and the straight line HD').

Item 15

The use according to Item 11, wherein in the refrigerant, coordinates (x,y,z) are within the range of a figure surrounded by straight lines FG, GJ, JI, and IF that connect the following four points:
point F (19.5, 43.4, 37.1),
point G (10.0, 50.8, 39.2),
point J (13.9, 45.4, 40.7), and
point I (19.2, 40.1, 40.7),
or on the straight lines.

Item 16

A composition comprising HFO-1123 and/or R32, the composition being for use in suppressing a disproportionation reaction of HFO-1132(E), the disproportionation reaction being suppressed by mixing HFO-1132(E), HFO-1123, and R32 such that
when the mass of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by straight lines AB, BP, and PA that connect the following three points:
point A (54.0, 0.0, 46.0),
point B (0.0, 68.0, 32.0), and
point P (0.0, 0.0, 100.0),
or on the straight line AB (excluding the points A and B).

Item 17

The composition according to Item 16, wherein in the refrigerant, coordinates (x,y,z) are within the range of a figure surrounded by straight lines AB, BD, DC, and CA that connect the following four points:
point A (54.0, 0.0, 46.0),
point B (0.0, 68.0, 32.0),
point D (0.0, 40.8, 59.2), and
point C (40.8, 0.0, 59.2),
or on the straight lines AB and DC (excluding the points A, B, D, and C).

Item 18

The composition according to Item 16, wherein in the refrigerant, coordinates (x,y,z) are within the range of a figure surrounded by straight lines EB, BD', and D'E that connect the following three points:
point E (33.8, 25.7, 40.7),
point B (0.0, 68.0, 32.0), and
point D' (0.0, 59.3, 40.7),
or on the straight lines EB and D'E (excluding the points B and D').

Item 19

The composition according to Item 16, wherein in the refrigerant, coordinates (x,y,z) are within the range of a figure surrounded by straight lines FG, GH, HD', D'I, and IF that connect the following five points:
point F (19.5, 43.4, 37.1),
point G (10.0, 50.8, 39.2),
point H (0.0, 59.8, 40.2),
point D' (0.0, 59.3, 40.7), and
point I (19.2, 40.1, 40.7),
or on the straight lines (excluding the points H and D', and the straight line HD').

Item 20

The composition according Item 16, wherein in the refrigerant, coordinates (x,y,z) are within the range of a figure surrounded by straight lines FG, GJ, JI, and IF that connect the following four points:
point F (19.5, 43.4, 37.1),
point G (10.0, 50.8, 39.2),
point J (13.9, 45.4, 40.7), and
point I (19.2, 40.1, 40.7),
or on the straight lines.

Item 21

A composition comprising a refrigerant,
the refrigerant comprising HFO-1132 (E), HFO-1123, and R32, wherein
when the mass % of HFO-1132 (E), HFO-1123, and R32 based on their sum is respectively represented by x, y, and z, coordinates (x,y,z) in a ternary composition diagram in which the sum of HFO-1132 (E), HFO-1132, and R32 is 100 mass % are within the range of a figure surrounded by straight lines FG, GH, HD', D'I, and IF that connect the following five points:
point F (19.5, 43.4, 37.1),
point G (10.0, 50.8, 39.2),
point H (0.0, 59.8, 40.2),
point P' (0.0, 59.3, 40.7), and
point I (19.2, 40.1, 40.7),
or on the straight lines (excluding the points H and D', and the straight line HD').

Item 22

The composition according to Item 21, wherein in the refrigerant, coordinates (x,y,z) are within the range of a figure surrounded by straight lines FG, GJ, JI, and IF that connect the following four points:
point F (19.5, 43.4, 37.1),
point G (10.0, 50.8, 39.2),
point J (13.9, 45.4, 40.7), and
point I (19.2, 40.1, 40.7),
or on the straight lines.

Item 23

The composition according to any one of Items 20 to 22 for use as a working fluid for a refrigerating machine, wherein the composition further comprises a refrigeration oil.

Item 24

The composition according to any one of Items 20 to 23, for use as an alternative refrigerant for R410A.

Item 25

Use of the composition according to any one of Items 4 to 6 as an alternative refrigerant for R410A.

Item 26

A refrigerating machine comprising the composition according to any one of Items 20 to 23 as a working fluid.

Item 27

A method for operating a refrigerating machine, comprising circulating the composition according to any one of Items 20 to 23 as a working fluid in a refrigerating machine.

Examples

The present disclosure is described in more detail below with reference to Examples. However, the present disclosure is not limited to the Examples.

Mixed refrigerants were prepared by mixing HFO-1132 (E), HFO-1123, and R32 at mass % shown in Tables 1 to 3 based on their sum.

Each of these mixed refrigerants was examined for the presence or absence of disproportionation reaction by using the following test methods under the following test conditions. Table 1 and FIG. 1 show the results.

Test Methods

A refrigerant composition to be tested was transferred to a test container and heated to 150° C. Subsequently, a Pt wire in the container was melted and cut by applying a voltage, giving the refrigerant composition 30 J of energy. The presence or absence of disproportionation reaction was determined based on a rapid increase in the pressure and temperature in the apparatus.

Test Conditions

Test container: 38-cc SUS container

Test temperature: 150° C.

Pressure: 3 MPa

Determination Criteria

Non-explosion: The temperature or pressure increased to less than twice after the melting and cutting of the Pt wire, and no rapid disproportionation reaction occurred.

Explosion: The temperature or pressure increased to twice or more after the melting and cutting of the Pt wire, and a rapid disproportionation reaction occurred.

TABLE 1

| tem | Unit | Experimental Series 1 | | | Experimental Series 2 | | | | | Experimental Series 3 | | |
|---|---|---|---|---|---|---|---|---|---|---|---|---|
| | | Comp. Ex. 1 | Comp. Ex. 2 | Comp. Ex. 3 | Comp. Ex. 4 | Comp. Ex. 5 | Ex. 1 | Ex. 2 | Ex. 3 | Comp. Ex. 6 | Comp. Ex. 7 | Comp. Ex. 8 |
| HFO-1132(E) | mass % | 55.0 | 54.0 | 52.0 | 29.0 | 27.0 | 27.0 | 27.0 | 25.6 | 0.0 | 0.0 | 0.0 |
| HFO-1123 | mass % | 0.0 | 0.0 | 0.0 | 34.0 | 36.0 | 34.0 | 32.0 | 34.0 | 66.0 | 68.0 | 70.0 |
| R32 | mass % | 44.0 | 46.0 | 48.0 | 37.0 | 37.6 | 39.0 | 41.0 | 41.0 | 34.0 | 32.0 | 30.0 |
| Disproportionation reaction (3 Mpa) | — | Explosion | Non-explosion | Non-explosion | Explosion | Explosion | Non-explosion | Non-explosion | Non-explosion | Explosion | Non-explosion | Non-explosion |

For each of these mixed refrigerants, the COP ratio and the refrigerating capacity ratio relative to those of R410 were determined. The calculation conditions were as follows.

Evaporating temperature: 5° C.
Condensation temperature: 45° C.
Superheating temperature: 5 K
Supercooling temperature: 5 K
Compressor efficiency: 70%

Tables 2 to 4 show these values, together with the GWP of ear mixed refrigerant. Table 4 also shows the results of examining the presence or absence of disproportionation reaction.

TABLE 2

| Item | Unit | Comp. Ex. 9 | Comp. Ex. 2 A | Comp. Ex. 7 B | Comp. Ex. 10 C | Comp. Ex. 11 D | Comp. Ex. 12 C' | Comp. Ex. 13 D' |
|---|---|---|---|---|---|---|---|---|
| HFO-1332 (E) | mass % | R410A | 54.0 | 0.0 | 40.8 | 0.0 | 59.3 | 0.0 |
| HFO-1123 | mass % | | 0.0 | 68.0 | 0.0 | 40.8 | 0.0 | 59.3 |
| R32 | mass % | | 46.0 | 32.0 | 59.2 | 59.2 | 40.7 | 40.7 |
| GWP | — | 2088 | 311 | 217 | 400 | 400 | 275 | 275 |
| COP ratio | % (relative to R410A) | 100.0 | 98.9 | 95.4 | 99.5 | 98.8 | 98.8 | 95.6 |
| Refrigerating capacity ratio | % (relative to R410A) | 100.0 | 111.4 | 115.3 | 112.6 | 114.5 | 110.8 | 115.5 |
| Condensation temperature glide ratio | (relative to R410A) | 1.00 | 0.04 | 1.41 | 0.26 | 3.83 | 0.24 | 2.43 |
| RCL | g/m$^3$ | — | 41.8 | 79.7 | 46.6 | 76.8 | 40.1 | 78.7 |

TABLE 3

| Item | Unit | Ex. 4 E | Ex. 5 F | Ex. 6 G | Comp. Ex. 14 H | Ex. 7 I | Ex. 8 J |
|---|---|---|---|---|---|---|---|
| HFO-1332 (E) | mass % | 33.6 | 19.5 | 10.0 | 0.0 | 19.2 | 13.9 |
| HFO-1123 | mass % | 25.7 | 43.4 | 50.8 | 59.8 | 40.1 | 45.4 |
| R32 | mass % | 40.7 | 37.1 | 39.2 | 40.2 | 40.7 | 40.7 |
| GWP | — | 275 | 251 | 265 | 272 | 275 | 275 |
| COP ratio | % (relative to R410A) | 97.5 | 96.5 | 96.5 | 96.5 | 96.9 | 96.8 |
| Refrigerating capacity ratio | % (relative to R410A) | 113.4 | 114.6 | 115.1 | 115.5 | 114.6 | 114.9 |
| Condensation temperature glide ratio | (relative to R410A) | 1.25 | 1.59 | 2.00 | 2.37 | 1.81 | 2.00 |
| RCL | g/m$^3$ | 51.0 | 50.0 | 67.9 | 78.8 | 60.0 | 64.2 |

TABLE 4

| Item | Unit | Comp. Ex. 15 | Ex. 9 | Ex. 10 | Comp. Ex. 16 | Ex. 11 | Ex. 12 |
|---|---|---|---|---|---|---|---|
| HFO-1132 (E) | mass % | 33.6 | 19.5 | 10.0 | 0.0 | 19.2 | 13.9 |
| HFO-1123 | mass % | 25.7 | 43.4 | 50.8 | 59.8 | 40.1 | 45.4 |
| RR32 | mass % | 40.7 | 37.1 | 39.2 | 40.2 | 40.7 | 40.7 |
| GWP | — | 275 | 251 | 255 | 272 | 275 | 275 |
| COP ratio | % (relative to R410A) | 97.5 | 95.5 | 96.5 | 96.5 | 96.9 | 96.8 |
| Refrigerating capacity ratio | % (relative to R410A) | 113.4 | 114.6 | 115.1 | 115.5 | 114.6 | 114.9 |
| Condensation temperature glide ratio | (relative to R410A) | 1.28 | 1.59 | 2.00 | 2.37 | 1.81 | 2.00 |
| RCL | g/m$^3$ | 51.0 | 60.0 | 67.9 | 78.8 | 80.0 | 64.2 |
| Disproportionation reaction (3 Mpa) | — | Explosion | Non-explosion | Non-explosion | Explosion | Non-explosion | Non-explosion |

These results indicate that in a mixed refrigerant of HFO-1132(E), HFO-1123, and R32 that satisfies the following requirements, disproportionation of HFO-1132(E) is suppressed at a refrigerant pressure of 3.0 MPa.

Requirements

In the refrigerant, coordinates (x,y,z) are within the range of a figure surrounded by straight lines AB, BP, and PA that connect the following three points:
 point A (54.0, 0.0, 46.0),
 point B (0.0, 68.0, 32.0), and
 point P (0.0, 0.0, 100.0),
 or on the straight line AB (excluding the points A and B).

These results indicate that in a mixed refrigerant of HFO-1132(E), HFO-1123, and R32 that satisfies the following requirements, it is not only that disproportionation of HFO-1132(E) is suppressed at a refrigerant pressure of 3.0 MPa, but also that the GWP is 400 or less.

Requirements

In the refrigerant, coordinates (x,y,z) are within the range of a figure surrounded by straight lines AB, BD, DC, and CA that connect the following four points:
 point A (54.0, 0.0, 46.0),
 point B (0.0, 68.0, 32.0),
 point D (0.0, 40.8, 59.2), and
 point C (40.8, 0.0, 59.2),
 or on the straight lines AB and DC (excluding the points A, B, D, and C).

These results indicate that in a mixed refrigerant of HFO-1132(E), HFO-1123, and R32 that satisfies the following requirements, it is not only that disproportionation of HFO-1132(E) is suppressed, but also that the GWP is 275 or less.

Requirements

In the refrigerant, coordinates (x,y,z) are within the range of a figure surrounded by straight lines EB, RD', and D'E that connect the following three points:
 point E (33.6, 25.7, 40.7),
 point B (0.0, 68.0, 32.0), and
 point D' (0.0, 59.3, 40.7),
 or on the straight lines EB and D'E (excluding the points B and D').

These results indicate that in a mixed refrigerant of HFO-1132(E), HFO-1123, and R32 that satisfies the following requirements, disproportionation of HFO-1132(E) is suppressed. Additionally, it is not only that the GWP is 275 or less, but also that the refrigerant concentration limit (RCL) is 60 g/m$^3$ or more, and the COP ratio is 96.5% or more relative to that of R410A.

Requirements

The refrigerant comprises HFO-1132 (E), HFO-1123, and R32, and when the mass % of HFO-1132 (E), HFO-1123, and R32 based on their sum is respectively represented by x, y, and z, coordinates (x,y,z) in a ternary composition diagram in which the sum of HFO-1132 (E), HFO-1123, and R32 is 100 mass % are within the range of a figure surrounded by straight lines FG, GH, HD', D'I, and IF that connect the following five points:
 point F (19.5, 43.4, 37.1),
 point G (10.0, 50.8, 39.2),
 point H (8.0, 59.8, 40.2),
 point D' (0.0, 59.3, 40.7), and
 point I (19.2, 40.1, 40.7),
 or on the straight lines.

These results indicate that in a mixed refrigerant of HFO-1132(E), HFO-1123, and R32 that satisfies the following requirements, disproportionation of HFO-1132 ((E) is suppressed. Additionally, it is not only that the GBP is 275 or less, but also that the refrigerant concentration limit (RCL) is 60 g/m$^3$ or more, the COP ratio is 96.5% or more relative to that of R410A, and the condensation temperature glide is 2.0 or less relative to that of R410A.

Requirements

In the refrigerant, coordinates (x,y,z) are within the range of a figure surrounded by straight lines FG, GJ, JI, and IF that connect the following four points:
 point F (19.5, 43.4, 37.1),
 point G (10.0, 50.8, 39.2),
 point J (13.9, 45.4, 40.7), and
 point I (19.2, 40.1, 40.7),
 or on the straight lines.

The invention claimed is:

1. A method for suppressing a disproportionation reaction of HFO-1132(E), the method comprising operating a refrigeration cycle using a composition comprising a refrigerant, the refrigerant comprising trans-1,2-difluoroethylene (HFO-1132(E)), trifluoroethylene (HFO-1123), and difluoromethane (R32),
 wherein
 when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by straight lines AB, BP, and PA that connect the following three points:
 point A (54.0, 0.0, 46.0),
 point B (0.0, 68.0, 32.0), and
 point P (0.0, 0.0, 100.0),
 or on the straight line AB (excluding the points A and B).

2. The method according to claim 1, wherein in the refrigerant, coordinates (x,y,z) are within the range of a figure surrounded by straight lines AB, BD, DC and CA that connect the following four points:
 point A (54.0, 0.0, 46.0),
 point B (0.0, 68.0, 32.0),
 point D (0.0, 40.8, 59.2), and
 point C (40.8, 0.0, 59.2),
 or on the straight lines AB and DC (excluding the points A, B, D, and C).

3. The method according to claim 1, wherein in the refrigerant, coordinates (x,y,z) are within the range of a figure surrounded by straight lines EB, BD', and D'E that connect the following three points:
 point E (33.6, 25.7, 40.7),
 point B (0.0, 68.0, 32.0), and
 point D' (0.0, 59.3, 40.7),
 or on the straight lines EB and D'E (excluding the points B and D').

4. The method according to claim 1, wherein in the refrigerant, coordinates (x,y,z) are within the range of a figure surrounded by straight lines FG, GH, HD', D'I, and IF that connect the following five points:
 point F (19.5, 43.4, 37.1),
 point G (10.0, 50.8, 39.2),
 point H (0.0, 59.8, 40.2),
 point D' (0.0, 59.3, 40.7), and
 point I (19.2, 40.1, 40.7),
 or on the straight lines (excluding the points H and D' and the straight line HD').

5. The method according to claim 1, wherein in the refrigerant, coordinates (x,y,z) are within the range of a figure surrounded by straight lines FG, GJ, JI, and IF that connect the following four points:
 point F (19.5, 43.4, 37.1),
 point G (10.0, 50.8, 39.2),
 point J (13.9, 45.4, 40.7), and
 point I (19.2, 40.1, 40.7),
 or on the straight lines.

6. A method of use of a composition comprising a refrigerant for suppressing a disproportionation reaction of HFO-1132(E), the refrigerant comprising HFO-1132(E), HFO-1123, and R32, wherein when the mass % of HFO-1132(E), HFO-1123, and R32 based on their sum is respectively represented by x, y, and z, coordinates (x,y,z) in a ternary composition diagram in which the sum of HFO-1132 (E), HFO-1123, and R32 is 100 mass % are within the range of a figure surrounded by straight lines AB, BP, and PA that connect the following three points: point A (54.0, 0.0, 46.0), point B (0.0, 68.0, 32.0), and point P (0.0, 0.0, 100.0), or on the straight line AB (excluding the points A and B).

7. The method of use according to claim 6, wherein in the refrigerant, coordinates (x,y,z) are within the range of a figure surrounded by straight lines AB, BD, DC, and CA that connect the following four points: point A (54.0, 0.0, 46.0), point B (0.0, 68.0, 32.0), point D (0.0, 40.8, 59.2), and point C (40.8, 0.0, 59.2), or on the straight lines AB and DC (excluding the points A, B, D, and C).

8. The method of use according to claim 6, wherein in the refrigerant, coordinates (x,y,z) are within the range of a figure surrounded by straight lines EB, BD', and D'E that connect the following three points: point E (33.6, 25.7, 40.7), point B (0.0, 68.0, 32.0), and point D' (0.0, 59.3, 40.7), or on the straight lines EB and D'E (excluding the points B and D').

9. The method of use according to claim 6, wherein in the refrigerant, coordinates (x,y,z) are within the range of a figure surrounded by straight lines FG, GH, HD', D'I, and IF that connect the following five points: point F (19.5, 43.4, 37.1), point G (10.0, 50.8, 39.2), point H (0.0, 59.8, 40.2), point D' (0.0, 59.3, 40.7), and point I (19.2, 40.1, 40.7), or on the straight lines.

10. The method of use according to claim 6, wherein in the refrigerant, coordinates (x,y,z) are within the range of a figure surrounded by straight lines FG, GJ, JI, and IF that connect the following four points: point F (19.5, 43.4, 37.1), point G (10.0, 50.8, 39.2), point J (13.9, 45.4, 40.7), and point I (19.2, 40.1, 40.7), or on the straight lines.

11. A method of use of HFO-1123 and/or R32 for suppressing a disproportionation reaction of HFO-1132(E), the disproportionation reaction being suppressed by mixing HFO-1132(E), HFO-1123, and R32 such that when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by straight lines AB, BP, and PA that connect the following three points: point A (54.0, 0.0, 46.0), point B (0.0, 68.0, 32.0), and point P (0.0, 0.0, 100.0), or on the straight line AB (excluding the points A and B).

12. The method of use according to claim 11, wherein in the refrigerant, coordinates (x,y,z) are within the range of a figure surrounded by straight lines AB, BD, DC, and CA that connect the following four points: point A (54.0, 0.0, 46.0), point B (0.0, 68.0, 32.0), point D (0.0, 40.8, 59.2), and point C (40.8, 0.0, 59.2), or on the straight lines AB and DC (excluding the points A, B, D, and C).

13. The method of use according to claim 11, wherein in the refrigerant, coordinates (x,y,z) are within the range of a figure surrounded by straight lines EB, BD', and D'E that connect the following three points: point E (33.6, 25.7, 40.7), point B (0.0, 68.0, 32.0), and point D' (0.0, 59.3, 40.7), or on the straight lines EB and D'E (excluding the points B and D').

14. The method of use according to claim 11, wherein in the refrigerant, coordinates (x,y,z) are within the range of a figure surrounded by straight lines FG, GH, HD', D'I, and IF that connect the following five points: point F (19.5, 43.4, 37.1), point G (10.0, 50.8, 39.2), point H (0.0, 59.8, 40.2), point D' (0.0, 59.3, 40.7), and point I (19.2, 40.1, 40.7), or on the straight lines (excluding points H and D', and the straight line HD').

15. The method of use according to claim 11, wherein in the refrigerant, coordinates (x,y,z) are within the range of a figure surrounded by straight lines FG, GJ, JI, and IF that connect the following four points: point F (19.5, 43.4, 37.1), point G (10.0, 50.8, 39.2), point J (13.9, 45.4, 40.7), and point I (19.2, 40.1, 40.7), or on the straight lines.

16. A composition comprising HFO-1123 and/or R32, the composition being for use in suppressing a disproportionation reaction of HFO-1132(E),
the disproportionation reaction being suppressed by mixing HFO-1132(E), HFO-1123, and R32 such that
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by straight lines AB, BP, and PA that connect the following three points:
point A (54.0, 0.0, 46.0),
point B (0.0, 68.0, 32.0), and
point P (0.0, 0.0, 100.0),
or on the straight line AB (excluding the points A and B).

17. The composition according to claim 16, wherein in the refrigerant, coordinates (x,y,z) are within the range of a figure surrounded by straight lines AB, BD, DC, and CA that connect the following four points:
point A (54.0, 0.0, 46.0),
point B (0.0, 68.0, 32.0),
point D (0.0, 40.8, 59.2), and
point C (40.8, 0.0, 59.2),
or on the straight lines AB and DC (excluding the points A, B, D, and C).

18. The composition according to claim 16, wherein in the refrigerant, coordinates (x,y,z) are within the range of a figure surrounded by straight lines EB, BD', and D'E that connect the following three points:
point E (33.6, 25.7, 40.7),
point B (0.0, 68.0, 32.0), and
point D' (0.0, 59.3, 40.7),
or on the straight lines EB and D'E (excluding the points B and D').

19. The composition according to claim 16, wherein in the refrigerant, coordinates (x,y,z) are within the range of a figure surrounded by straight lines FG, GH, HD', D'I, and IF that connect the following five points:
point F (19.5, 43.4, 37.1),
point G (10.0, 50.8, 39.2),
point H (0.0, 59.8, 40.2),
point D' (0.0, 59.3, 40.7), and
point I (19.2, 40.1, 40.7),
or on the straight lines (excluding the points H and D', and the straight line HD').

20. The composition according to claim 16, wherein in the refrigerant, coordinates (x,y,z) are within the range of a figure surrounded by straight lines FG, GJ, JI, and IF that connect the following four points:
point F (19.5, 43.4, 37.1),
point G (10.0, 50.8, 39.2),
point J (13.9, 45.4, 40.7), and
point I (19.2, 40.1, 40.7),
or on the straight lines.

21. A composition comprising a refrigerant,
the refrigerant comprising HFO-1132 (E), HFO-1123, and R32,
wherein
when the mass % of HFO-1132 (E), HFO-1123, and R32, based on their sum is respectively represented by x, y, and z, coordinates (x,y,z) in a ternary composition diagram in which the sum of HFO-1132 (E), HFO-1123, and R32 is 100 mass % are within the range of a figure surrounded by straight lines FG, GH, HD', D'I, and IF that connect the following five points:
point F (19.5, 43.4, 37.1),
point G (10.0, 50.8, 39.2),
point H (0.0, 59.8, 40.2),
point D' (0.0, 59.3, 40.7), and
point I (19.2, 40.1, 40.7),
or on the straight lines (excluding the points H and D', and the straight line HD').

22. The composition according to claim 21, wherein in the refrigerant, coordinates (x,y,z) are within the range of a figure surrounded by straight lines FG, GJ, JI, and IF that connect the following four points:
point F (19.5, 43.4, 37.1),
point G (10.0, 50.8, 39.2),
point J (13.9, 45.4, 40.7), and
point I (19.2, 40.1, 40.7),
or on the straight lines.

23. The composition according to claim 20 for use as a working fluid for a refrigerating machine, wherein the composition further comprises a refrigeration oil.

24. The composition according to claim 20, for use as an alternative refrigerant for R410A.

25. The method of use of the composition according to claim 21 as an alternative refrigerant for R410A.

26. A refrigerating machine comprising the composition according to claim 21 as a working fluid.

27. A method for operating a refrigerating machine, comprising circulating the composition according to claim 21 as a working fluid in a refrigerating machine.

* * * * *